(12) United States Patent
Ling

(10) Patent No.: US 7,508,658 B2
(45) Date of Patent: Mar. 24, 2009

(54) COMPUTER DOCK FOR CONNECTING VARIOUS ELECTRONIC DEVICES WITH DIFFERENT THICKNESS

(75) Inventor: Kuo-Nan Ling, Taipei (TW)

(73) Assignee: Compal Electronics, Inc., Taipei (TW)

( * ) Notice: Subject to any disclaimer, the term of this patent is extended or adjusted under 35 U.S.C. 154(b) by 32 days.

(21) Appl. No.: 11/892,696

(22) Filed: Aug. 27, 2007

(65) Prior Publication Data

US 2008/0054769 A1 Mar. 6, 2008

(51) Int. Cl.
*H05K 5/00* (2006.01)
*H05K 7/00* (2006.01)

(52) U.S. Cl. .................................... 361/683

(58) Field of Classification Search ................ 361/683, 361/684, 685, 686; 312/223.2; 439/247, 439/248
See application file for complete search history.

(56) References Cited

U.S. PATENT DOCUMENTS

| 6,188,572 | B1 * | 2/2001 | Liao et al. ................. 361/686 |
| 6,527,572 | B2 * | 3/2003 | Jou ............................ 439/248 |
| 7,417,855 | B2 * | 8/2008 | Carnevali .................... 361/686 |
| 2001/0031570 | A1 * | 10/2001 | Horikoshi et al. ........... 439/137 |

* cited by examiner

*Primary Examiner*—Chandrika Prasad
(74) *Attorney, Agent, or Firm*—Bacon & Thomas, PLLC

(57) ABSTRACT

A computer dock comprises a main body and a retractable assembly disposed on the back side of the main body, the retractable assembly includes a slide, a connector, a supporting plate and a moving block, and both the moving block and the connector are protruded out the main body and provided function of vertical movement, when an electronic device put on the main body of the computer dock for connection the moving block is then by vertical movement to drive the slide moved in horizontal movement and further to drive the connector moved back in vertical movement relative to the slide horizontally moved, by this manner the computer dock in application allows various electronic devices with different thicknesses to connect.

3 Claims, 4 Drawing Sheets

COMPUTER DOCK FOR CONNECTING VARIOUS ELECTRONIC DEVICES WITH DIFFERENT THICKNESS

BACKGROUND OF THE INVENTION

1. Field of the Invention

The present invention relates to a computer dock, and more particularly, to a computer dock for connecting various electronic devices with different thickness.

2. Description of the Related Art

A computer dock in an electronic device refers to a peripheral platform disposed below the processor of a laptop. A computer dock usually has built-in peripheral equipment such as a CD-Rom, a disk driver or a second battery. Therefore, a computer dock becomes an external peripheral of a laptop when it is connected to the laptop.

Nevertheless, the connector of a conventional computer dock for connecting to a laptop is usually not retractable. When an electronic device of a different thickness is to be connected via a computer dock, a computer dock that has been designed to fit the thickness of the electronic device must be used. Thus, the usage of a conventional computer dock of prior arts for connecting electronic devices of various thicknesses is still limited at this stage.

SUMMARY OF THE INVENTION

Therefore, one object of the present invention is to provide a computer dock, which has a retractable connector for connecting to electronic devices of various thicknesses in order to make the computer dock more useable.

Another object of the present invention is to provide a computer dock that comprises a main body and a retractable assembly disposed on the back of the main body. The retractable assembly includes a slide, a connector, a supporting plate and a moving block, wherein the moving block and part of the connector are protruding outwardly from the front of the main body, and the moving block can only move vertically. When the moving block moves vertically, the slide is driven to move in horizontal direction only. The connector is fixed on the back of the supporting plate and the two are disposed inside of the slide together. When the slide moves horizontally, the connector and the supporting plate can only move vertically inside the slide. Therefore, when an electronic device of different thickness is disposed on the main body of the computer dock, the moving block that protrudes from the main body is forced to move vertically by the external force, which in turn drives the slide to move horizontally to drive the connector to retract vertically, while the moving distance of the connector varies according to various thicknesses of electronic devices. When an electronic device is no longer connected to the computer dock, the slide moves horizontally back to the original position; meanwhile, the slide drives the connector and the moving block to extend vertically and return to the original position.

DETAILED DESCRIPTION OF THE PREFERRED EMBODIMENT

Figure 1:
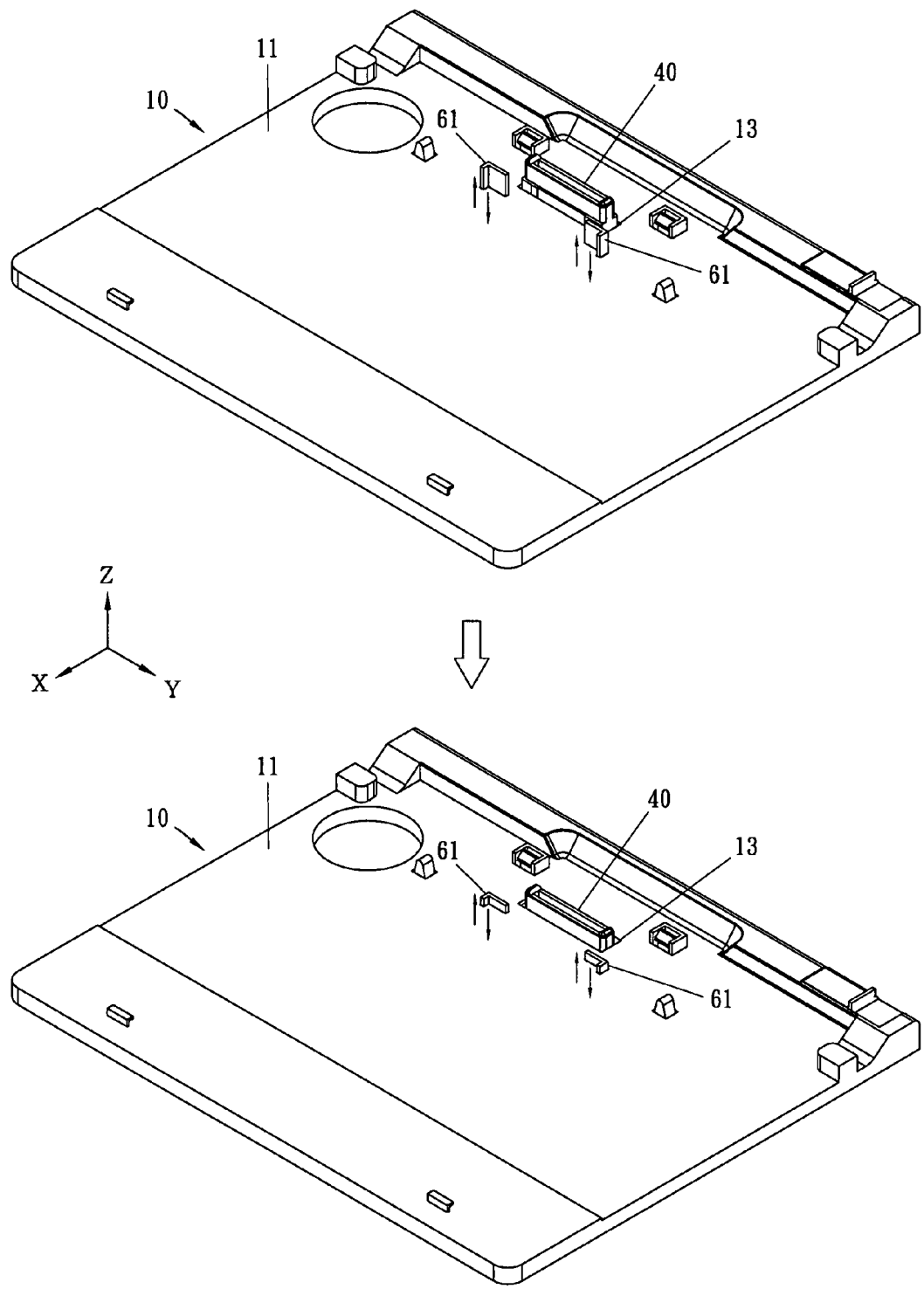
FIG. 1 is schematic drawing showing how a computer dock charges electronic devices of various thicknesses through a retractable connector according to a preferred embodiment of the present invention.
Figure 2:
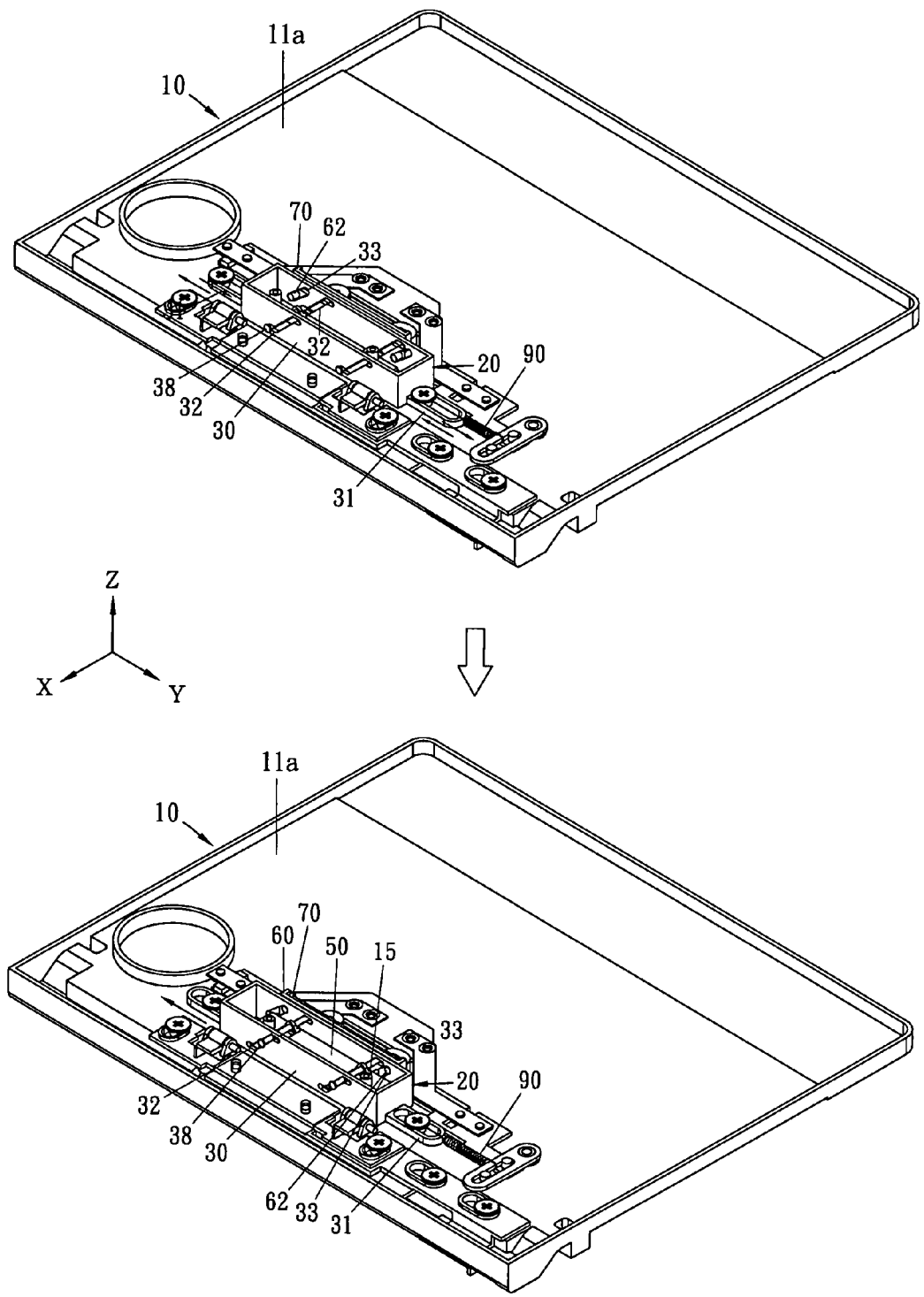
FIG. 2 is schematic drawing showing a computer dock provided with a retractable assembly according to a preferred embodiment of the present invention.

As shown in FIG. 1 and FIG. 2, a computer dock 10 according to the present invention includes a main body 11 and a retractable assembly 20. The retractable assembly 20 has a connector 40 for connecting to electronic devices of various thicknesses.

Figure 3:
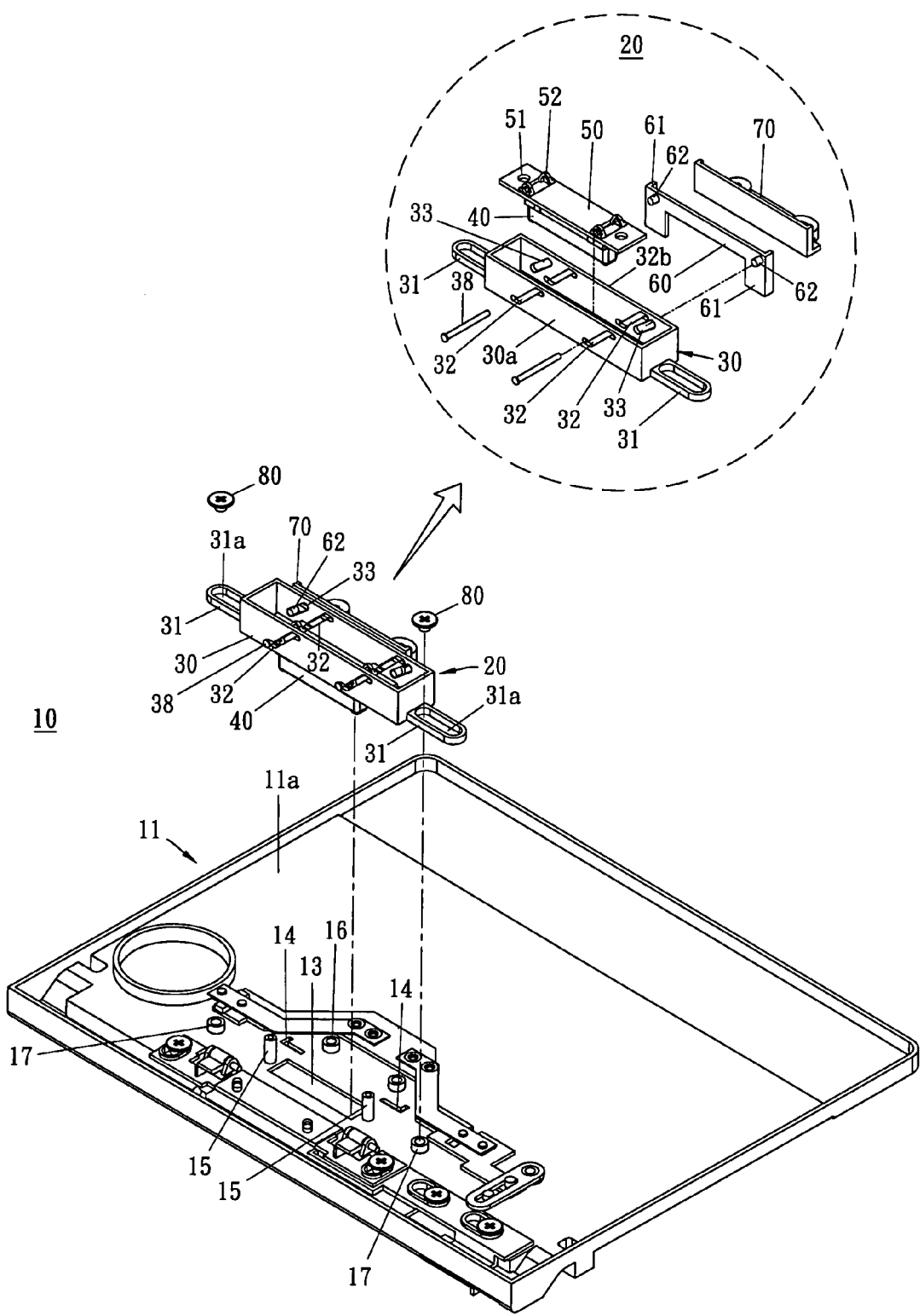
FIG. 3 is an exploded drawing for showing parts of the retractable assembly in FIG. 2.

As shown in FIG. 3, the main body 11 has a slot 13 and a pair of guiding grooves 14 passed through, and further has a pair of guiding posts 15, a pair of screw posts 16 and a pair of fixing posts 17 disposed on back side 11a.

The retractable assembly 20 is installed on the back side 11a of the main body 11 and includes a slide 30, a connector 40, a supporting plate 50 and a moving block 60. A guiding plate 70 can be further added to form another preferred embodiment of the present invention.

The supporting plate 50 has a pair of guiding holes 51 and a pair of protruding hubs 52 disposed thereon. A pair of linkages 38 are provided to have each respectively passed through the corresponding protruding hub 52 of the supporting plate 50 to form a pivotal connection. The guiding hole 51 on the two sides of the supporting plate 50 corresponds to the guiding post 15 on the back of the main body 11 to allow the supporting plate 50 to slip on the guiding post 15 of the main body 11 through the guiding hole 51. Therefore, when the guiding post 15 of the main body 11 passes through the guiding hole 51 of the supporting plate 50, the movement of the supporting plate 50 is limited by the guiding post 15 to only along the z-axis.

The connector 40 is fixed on the back of the supporting plate 50. When the supporting plate 50 slips in the guiding post 15 of the main body 11 by the guiding hole 51, the majority of the connector 40 protrudes from the slot 13 of the main body 11, and moves with the supporting plate 50 along the z-axis.

A guiding track 61 is disposed on the two sides of the moving block 60 and corresponds to the guiding groove 14 of the main body 11. When the retractable assembly 20 is disposed on the back side 11a of the main body 11, the guiding track 61 of the moving block 60 protrudes from the guiding groove 14 of the main body 11. The movement of the moving block 60 is limited by the guiding groove 14, which only allows it to move along the z-axis, due to the guiding track 61 of the moving block 60 passed through the guiding groove 14 of the main body 11, For the purpose of providing guiding and smooth vertical movement of the moving block 60 along the z-axis, the retractable assembly 20 can be further provided with a guiding plate 70. When the guiding plate 70 is fixed on the screw post 16 on the back side 11a of the main body 11, the guiding track 61 on the two sides of the moving block 60 lean on the two sides of the guiding plate 70, so that the moving block 60 is guided by the guiding plate 70 when it is moving along the z-axis.

The slide 30 is a hollow shell comprising a front wall 30a, a rear wall 30b, and two lateral walls. A limiting block 31 protrudes outwardly from the two lateral walls respectively, and a long slot 31a is disposed on each of the limiting blocks 31. A pair of functionally identical oblique guiding grooves 32 are disposed are disposed on the front wall 30a and the rear wall 30b, and a pair of oblique guiding grooves 33 are disposed on the rear wall 30b, which are parallel to the oblique guiding grooves 32 disposed on the rear wall 30b.

The slide 30 is hollow for the connector 40 and the supporting plate 50 to be disposed therein, besides, when the connector 40 and the supporting plate 50 move along the z-axis vertically, the horizontal movement of the slide 30 along the y-axis is not interfered.

When the connector 40 and the supporting plate 50 are disposed together into the slide 30, the linkage 38 passes through the an oblique guiding groove 32 of a front wall 30a of the slide 30, the protruding hub 52 of the supporting plate 50 and the oblique guiding groove 32 of a rear wall 30b of the slide 30, for the linkage 38 to cross the inside of the oblique guiding groove 32 of the front wall 30a and the rear wall 30b. With such structure, the linkage 38 and the oblique guiding groove 32 of the slide 30 form a slide mechanism, while a pivotal linkage is formed between the linkage 38 and the supporting plate 50.

Figure 4:
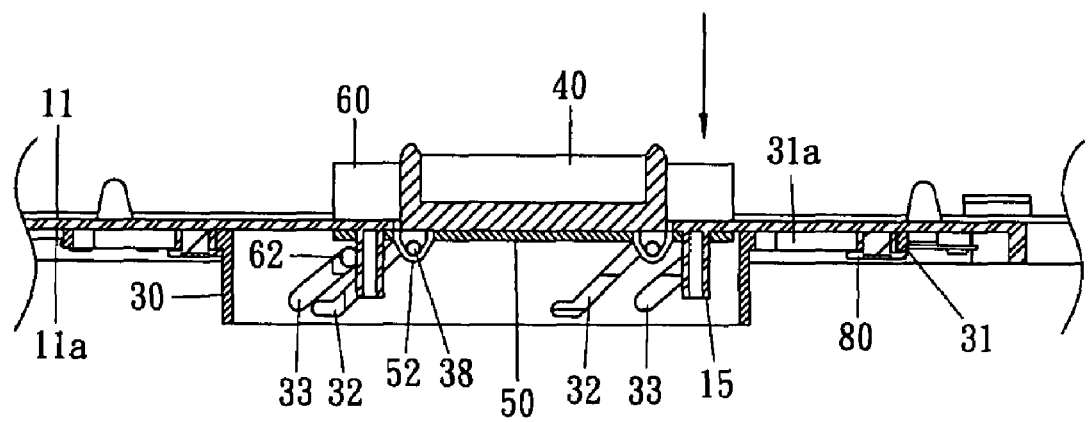
FIG. 4 is an illustration showing the relationship between the movements of each part of the retractable assembly.
Figure 4:
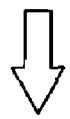
Figure 4:
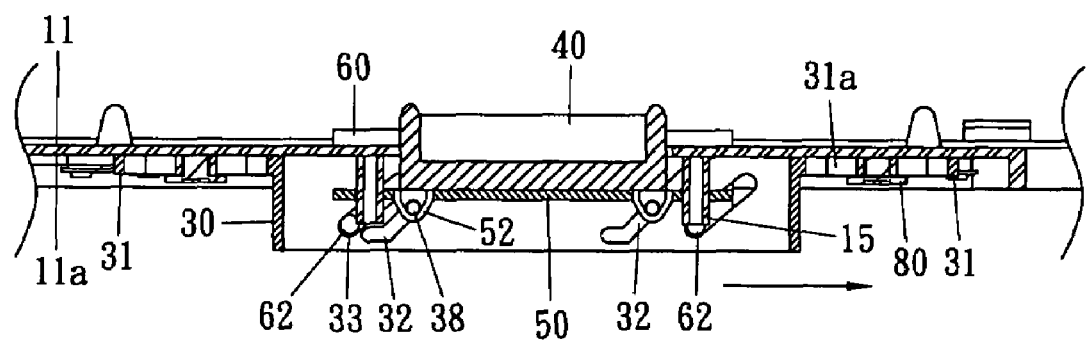

The moving block 60 further has a pair of guiding blocks 62 disposed in front of the moving block 60. When assembling these components, the guiding block 62 of the moving block 60 slips into an oblique guiding groove 33 provided by the rear wall 30b of the slide 30. As shown in FIG. 2 and FIG. 4, when the moving block 60 moves along the z-axis vertically, the guiding block 62 of the moving block 60 moves vertically along the z-axis in the oblique guiding groove 33 of the slide 30 together with the moving block 60, thereby making the slide 30 moving along the y-axis in a different direction.

As shown in FIG. 1 to FIG. 4, during the assembling process, the connector 40 of the retractable assembly 20 and a part of the moving block 60 protrudes from the main body 11, however, the supporting plate 50 of the retractable assembly 20 is limited by the guiding post 15, and thus the connector 40 and the supporting plate 50 can only move along the z-axis together. Equally, the moving block 60 of the retractable assembly 20 is limited by the guiding groove 14 of the main body 11, which makes it moveable only along the z-axis. In addition, the fixing post 17 disposed on the back side 11a of the main body 11 slips into a long slot 31a of a limiting block 31 of the slide 30 of the retractable assembly 20. After fixing a limiting member 80 to the fixing post 17, the long slot 31a of the limiting block 31 of the slide 30 and the fixing post 17 of the main body 11 form a sliding mechanism. Thus, the maximum horizontal moving distance of the slide 30 along the y-axis is limited.

Furthermore, as shown in FIG. 2, an elastic member 90 is further included in the computer dock 10 according to the present invention, and one end of the elastic member 90 is fixed to the back side 11a of the main body 11 while the other end thereof is connected to the slide 30 of the retractable assembly 20. When the slide 30 is moved horizontally along the y-axis, the slide 30 can return to the original position by the tensile force of the elastic member 90.

While in use, a part of the moving block 60 of the computer dock 10 protrudes from the main body 11 of the computer dock 10. When the moving block 60 is moved along the z-axis due to an external force, the guiding block 62 on the moving block 60 will drive the slide 30 to move along the y-axis.

When the slide 30 moves along the y-axis, the elastic member 90 is pulled, and the oblique guiding groove 32 of the slide 30 drives the linkage 38, thereby making the supporting plate 50 and the connector 40 to retract along the z-axis simultaneously in the direction of the external force.

When the external force disappears, the elastic member 90 exerts a repositioning force to the slide 30 to make it return to the original position along the y-axis. During the process of returning to the original position of the slide 30, the oblique guiding groove 32 of the slide 30 drives the linkage 38 and thus making the supporting plate 50 and the connector 40 to move along the z-axis simultaneously, in the direction opposing the external force and return to the original position.

In sum, the connector 40 of the retractable assembly 20 in the computer dock 10 is retractable according to the present invention, which enables the computer dock 10 of the invention to allow electronic devices of various thicknesses to connect to it.

What is claimed is:

1. A computer dock, comprising a main body and a retractable assembly disposed on a back side of the main body, wherein
   the main body has a slot and a pair of guiding grooves disposed thereon, and has a pair of guiding posts and a pair of fixing posts disposed on the back; and
   the retractable assembly includes a slide, a connector, a supporting plate and a moving block, wherein
      the slide is a hollow shell having a front wall, a rear wall and two lateral walls; a pair of oblique guiding grooves are separately disposed on the front wall and the rear wall for a pair of linkages being separately disposed inside and across therein, the rear wall is further provided with a pair of oblique sliding grooves, and every lateral wall horizontally protrudes out a limiting block with a long slot disposed inside for the relative fixing post of the main body being fitted therein;
      the supporting plate disposed inside the slide has a pair of guiding holes each provided for one relative guiding post of the main body passed through and a pair of protruding hubs each provided for one relative linkage passed through to form a pivotal connection;
      the connector is fixed on the supporting plate and protruded from the slot of the main body; and
      the moving block has a pair of guiding tracks formed on two sides each corresponding to and protruded from one relative guiding groove of the main body, and the moving block further has a pair of guiding blocks each fitted in the oblique sliding groove disposed on the rear wall of the slide.

2. The computer dock as described in claim 1, wherein a guiding plate is further fixed on the back side of the main body provided for each guiding tracks of the moving block leant to two sides of the guiding plate.

3. The computer dock as described in claim 2, wherein an elastic member is further disposed on the back side of the main body by means of a free end connected to the slide.

* * * * *